E. B. MEYROWITZ.
EYEGLASSES.
APPLICATION FILED DEC. 16, 1908.

1,069,278.

Patented Aug. 5, 1913.

Witnesses:
Francis Ober
Ant Proctor

Inventor
Emil B. Meyrowitz
By his Attorneys
Rosenbaum & Stockbridge

UNITED STATES PATENT OFFICE.

EMIL B. MEYROWITZ, OF NEW YORK, N. Y., ASSIGNOR TO THE MEYROWITZ MANUFACTURING COMPANY, A CORPORATION OF NEW JERSEY.

EYEGLASSES.

1,069,278.      Specification of Letters Patent.      Patented Aug. 5, 1913.

Application filed December 16, 1908. Serial No. 467,813.

*To all whom it may concern:*

Be it known that I, EMIL B. MEYROWITZ, a citizen of the United States, residing at the city of New York, in the borough of Manhattan and State of New York, have invented certain new and useful Improvements in Eyeglasses, of which the following is a full, clear, and exact description.

My invention relates to eyeglasses of that type which has separately pivoted nose guards each independently spring-impelled to exert a yielding clamping pressure on the nose. In my prior application Serial No. 412,251, a construction for this purpose is shown, in which the hinge mountings of the nose guards are made comparatively inconspicuous by locating them behind the clips or straps supporting the glasses. By the present invention I provide a form of spring hinge connection between the bridge and the nose guards which is substantially invisible, the complete spring hinge being hardly more conspicuous than rigid or integral fastenings between the parts. The most important factor in securing this result is the entire inclosure of the operating springs of the hinges in the bridge, each being snugly fited within and guided by a cylindrical cavity of the bridge. The efficiency of this arrangement considered as a pivot or bearing to permit only angular movement in a plane transverse to the pivot pin, is however, increased by flat surfaces of the guard, which embrace corresponding plane portions of the bridge at the ends of the cylindrical cavity above referred to.

In another aspect the present invention may be said to include a spring completely housed in a cylindrical cavity of the bridge.

Figure 1:
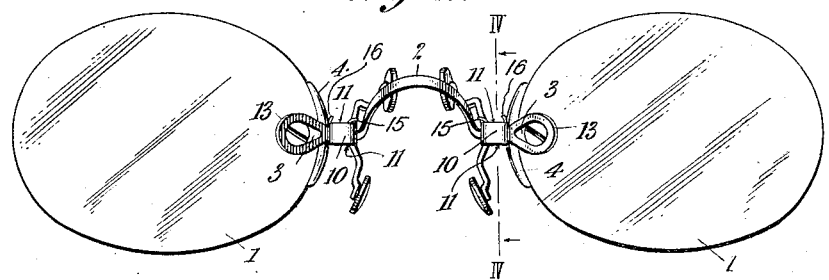
Figure 2:
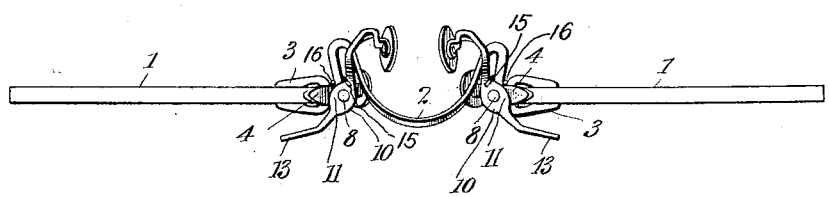
Figure 3:
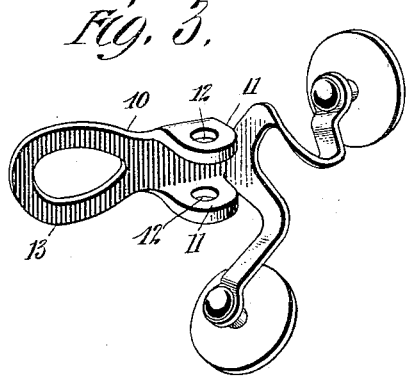
Figure 4:
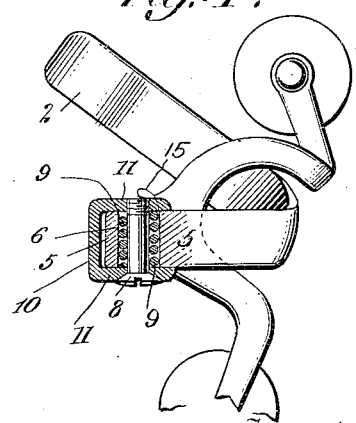

In the drawings: Figure 1 is a front view of a pair of glasses having spring guards, embodying the principles of my invention; Fig. 2 is a top view of the same; Fig. 3 is a detail perspective view of one of the guards, and Fig. 4 is a vertical sectional view on the line IV—IV of Fig. 1, looking in the direction of the arrows.

The lenses 1 are joined by a metallic bridge 2 secured to the lenses by the clips or straps 3 having wings 4. The bridge 2 may be of any desired form, having, however, portions 5 adjacent to the clips 3 which are substantially flat in a transverse horizontal plane of the glasses. These flattened portions 5 of the bridge may be merely vertically drilled with round cylindrical holes or cavities 6 which I prefer should extend entirely through from one side to the other. While this is my preferred manner of forming the vertical cylindrical cavities 6, I do not desire to be limited or restricted thereto, since the cavities may be established in other ways than by the vertically drilled holes mentioned.

8 denotes the pivot post or pin which has a diameter considerably less than that of the cylindrical cavity 6. This pin is received within the cavity 6, but does not touch the walls of said cavity on any side. In order to fix the position of the pivot pin within the cavity 6, I make use of a simple spiral spring 9 coiled into a helix which fits quite accurately in the space between the pivot pin and the wall of the cylindrical cavity 6. In this relation the spiral spring 9 is adapted to constitute a sleeve, and establishes a perfect bearing surface which centers the pin in rotatable relation in the cavity as efficiently as if the pin were snugly guided by the cylindrical wall 6 direct. The guards 10 have ears 11 embracing the flat portions 5 of the bridge, the ears being vertically drilled with holes 12 to receive the pivot pin 8. The ends of the spring 9 project from the cavity 6 and engage portions of the guards 10 and the bridge 2, respectively, so as to impel the guards with respect to the bridge in a direction to clamp upon the nose of the wearer. I have illustrated the upper end 15 of the spring 9 hooked around an adjacent portion of the guard 10 so as to impel the nose engaging portion of the guard in a direction to clamp on the nose of the wearer in use. The lower end 16 of each spring 9 is anchored to the bridge by simply bending such lower end around the lower edge of the portion 5 thereof, and upward in a crevice or corner which is conveniently present in the bridge on account of its peculiarly bent form at the point of its engagement with the clips or straps 3. Each of the guards has the usual extension 13 which projects at the front of the glasses and which can be manipulated by the fingers in removing or applying the same.

It will be evident that the various purposes and objects set forth in the preliminary part of the specification are accomplished by the foregoing construction, the hinge being efficient to permit angular movements of the guards in a plane transverse of the pivot pin, but precluding any movement or looseness in other planes or directions. Besides this, an exceedingly compact form of hinge is provided, and one in which the operating spring, together with all the other hinge parts, are wholly concealed.

What I claim is:—

In a pair of eyeglasses, a bridge having flattened horizontal portions with vertical cylindrical recesses, spiral springs closely received in said recesses, and guards having ears closely embracing said flattened portions of the bridge and having pivot pins closely contained within said spring, the extremities of said springs engaging said guards and bridge respectively.

In witness whereof, I subscribe my signature, in the presence of two witnesses.

EMIL B. MEYROWITZ.

Witnesses:
 JOHN BOHLING,
 WILLIAM P. HALL.

Copies of this patent may be obtained for five cents each, by addressing the "Commissioner of Patents, Washington, D. C."